G. McKNIGHT.
Automatic Gate.
No. 45,063. Patented Nov. 15, 1864.
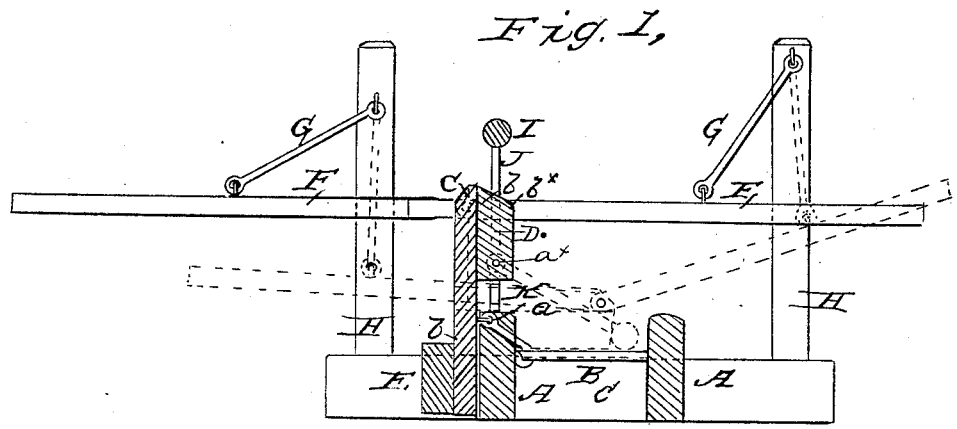
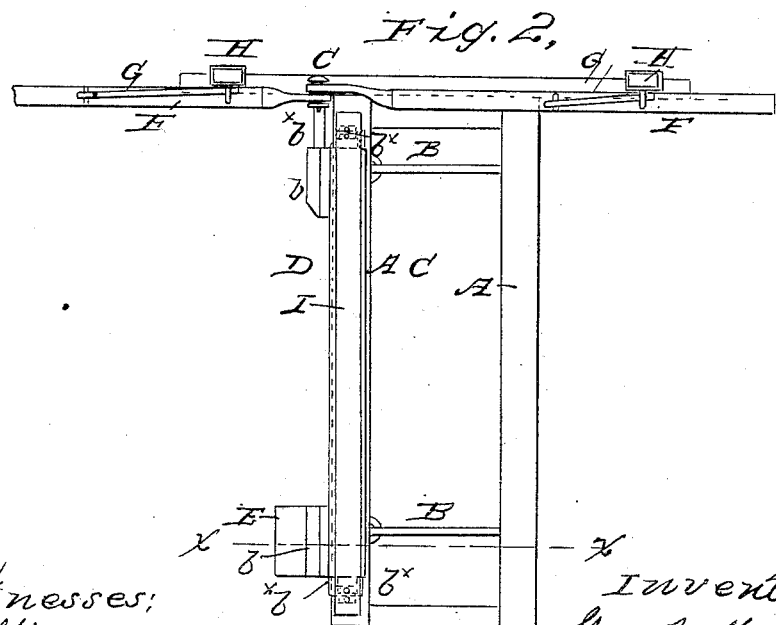
Witnesses:
C L Topliff
Henry Wines
Inventor:
George McKnight
Munn & Co
Attorneys

UNITED STATES PATENT OFFICE.

GEORGE McKNIGHT, OF HEBRON, NEW YORK.

IMPROVEMENT IN AUTOMATIC-GATES.

Specification forming part of Letters Patent No. 45,063, dated November 15, 1864.

*To all whom it may concern:*

Be it known that I, GEORGE MCKNIGHT, of Hebron, in the county of Washington and State of New York, have invented a new and Improved Gate; and I do hereby declare that the following is a full, clear, and exact description thereof, which will enable others skilled in the art to make and use the same, reference being had to the accompanying drawings, making a part of this specification, in which—

Figure 1 represents a side sectional view of my invention, taken in the line $x\ x$, Fig. 2; Fig. 2, a plan or top view of the same.

Similar letters of reference indicate like parts.

This invention relates to a new and improved gate of that class which admits of being opened and closed by a rider or driver without the latter dismounting from a horse or getting out of a vehicle.

The invention consists in the employment or use of two parallel sleepers placed or sunk into the earth with a ditch or trench between them and a gate connected by hinges or joints to one of the sleepers, the gate having levers attached to it, and all arranged in such a manner as to admit of being opened and closed by the rider or driver with the greatest facility.

The invention further consists in the employment or use of an extension-rail applied to the gate in such a manner that when the gate is raised the rail will rise automatically with it and project some distance above it to increase the height, and at the same time add to its general appearance, the rail, as the gate is opened or let down, also automatically descending and coming in contact with the outer edge of the gate when the latter reaches a horizontal position or open state.

A A represent two sleepers which are sunk in the earth and connected at a suitable distance apart by cross rods or bars B B. It is designed that the tops of the sleepers shall be flush with the surface of the earth, and a ditch or trench, C, of about two and a half ($2\frac{1}{2}$) feet in width and one and a half ($1\frac{1}{2}$) feet deep be between the sleepers.

D is a gate, which is connected by hinges $a$ to one of the sleepers A, so that it may be raised to a vertical position in line with the sleeper to which it is attached, or turned down to a horizontal position so as to cover and form a bridge over the ditch or trench between the sleepers, the gate when down resting upon the rods or bars B B, as shown in red in Fig. 1. The gate D is provided with a weight or counterpoise, E, which may be attached to one of its bottoms, $b$, at the side of the hinges opposite to that where the gate is attached. This weight or counterpoise facilitates the rising and falling of the gate, the weight of the latter preponderating when it reaches an angle of forty-five degrees in closing, and the weight of E preponderating when the gate reaches the same angle in rising, the weight or counterpoise keeping the gate in an elevated position.

F F represent two levers, the inner ends of which are attached by a pivot, $e$, to one end of the gate D. These levers are suspended by rods G G from uprights H H, placed one at each side of the gate, the outer ends of said levers being within convenient reach of a rider or driver at either side of the gate. The gate is opened or closed through the medium of these levers. When the gate is raised, it is in a ·closed state, and it, in connection with the ditch or trench, serves all the purposes of a fence or barrier against animals.

The sleepers may be made of three (3) by four (4) inch scantling, framed together with cross-bars and underpinned with stone.

In order to increase the height of the gate when the same is in an elevated or closed state, I employ what I term an "automatic extension-rail," I, the ends of which are attached to rods J J, the back ends of the latter being connected by joints or hinges $a^*$ to uprights K K at the ends of the sleeper to which the gate is hinged. At each end of the gate D there are pins $b^*\ b^*$, between which the rods J J are fitted loosely, said pins forming a connection between the rods and the gate. It will be seen that by this arrangement the rail I will be raised and lowered with the gate D, and the uprights K K are of such a height that the rail I, when the gate is in an elevated or closed state, will be some distance above the gate, as shown in tint in Fig. 1, and the rail, when the gate is opened or let down, will be in contact with the end of the gate, as shown in red in Fig. 1, the difference in the relative position of the rail with the gate when in an opened or closed state, or in an upright and horizontal position, being due to the difference in the position of the hinges or joints $a$ of the gate, and the joints $a^\times$ of the rods J J, as will be understood by referring to Fig. 1.

I claim as new and desire to secure by Letters Patent—

1. The two sleepers A A, in combination with the gate D, the latter being attached by hinges to one of the former, and a ditch or trench, C, being between the sleepers, all arranged substantially as and for the purpose specified.

2. The two levers F F, applied to the gate D and suspended from the uprights H H, substantially as and for the purpose herein set forth.

3. The extension-rail I, when applied to the gate D to operate automatically therewith, substantially as and for the purpose specified.

GEORGE McKNIGHT.

Witnesses:
JOHN A. McKNIGHT,
W. T. FRASER.